UNITED STATES PATENT OFFICE.

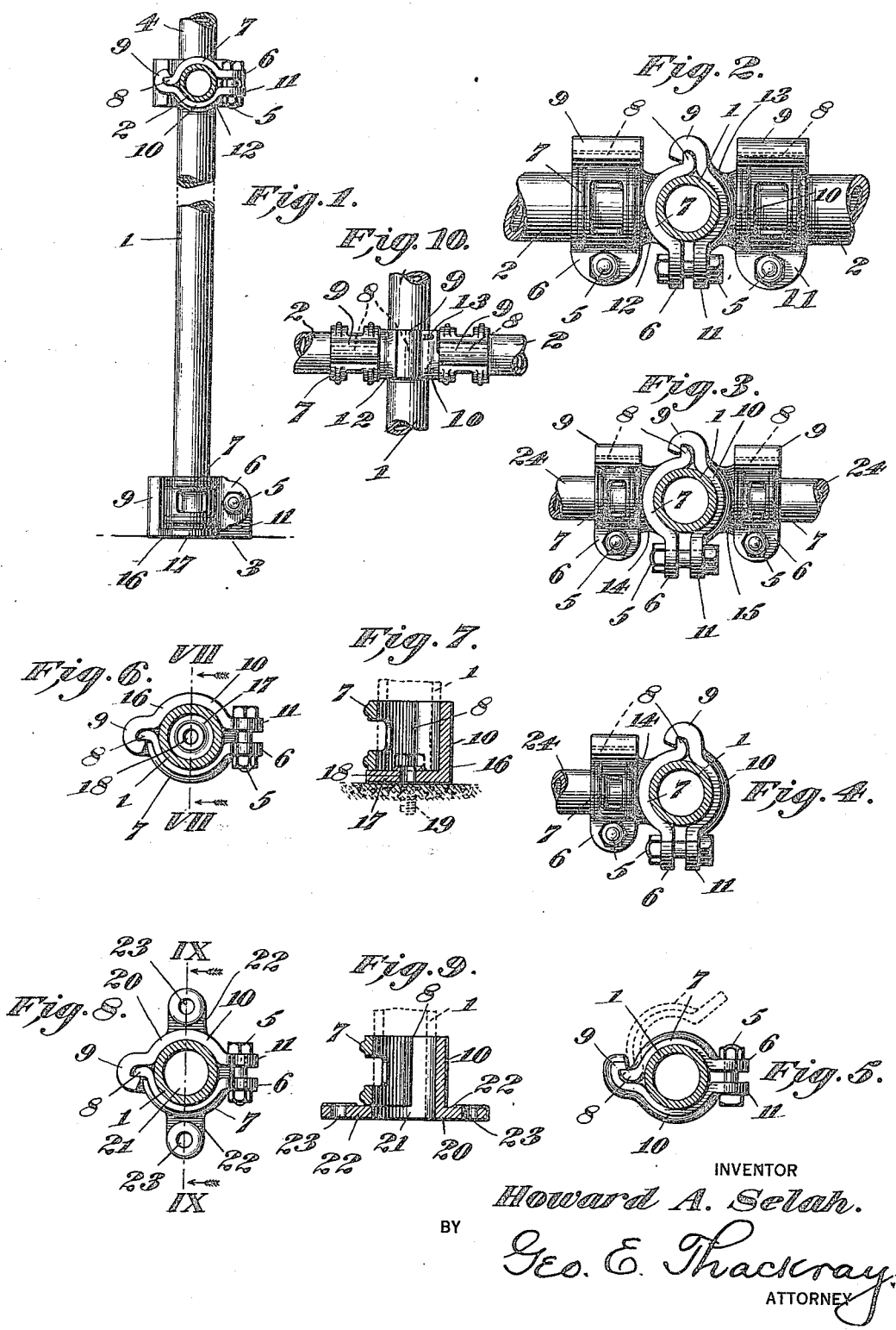

HOWARD A. SELAH, OF JOHNSTOWN, PENNSYLVANIA, ASSIGNOR, BY MESNE ASSIGNMENTS, TO JACOB F. KRESS, OF JOHNSTOWN, PENNSYLVANIA.

CLAMP SUPPORT.

1,416,386.   Specification of Letters Patent.   Patented May 16, 1922.

Application filed December 13, 1919. Serial No. 344,535.

*To all whom it may concern:*

Be it known that I, HOWARD A. SELAH, a citizen of the United States, and a resident of the city of Johnstown, county of Cambria, and State of Pennsylvania, have invented certain new and useful Improvements in Clamp Supports; and I do hereby declare the following to be a full, clear, and exact description of the invention, such as will enable others skilled in the art to which it appertains to make and use the same.

My invention relates to improvements in clamp supports, with special reference to those types which are adaptable for use in the construction and support of switchboards in electrical stations, and also is particularly adapted for carrying wires, cables and other electrical equipment. My clamp support is adapted for use in connection with any type or size of pipes, bars, rods or other sections of supporting or structural members, but for the purpose of convenience of illustration I have shown it in connection with pipes, but wish it understood that it may be used in connection with any other form as noted.

My invention generally consists of a clamp support, having male and female members, and formed integral with the female member is a hooked end portion adapted to partially surround the pipe or other structural member, and the other end thereof is provided with an extending ear with a bolt-hole therein. The extremity of the hooked end of my clamp support is made tapering or rounded, for reasons that will hereinafter more fully appear. The other and corresponding male member of my clamp support is provided with an extension end or lug adapted to fit within the hooked end, the end portion of this being tapered and rounded, and the body portion formed integral therewith is proportioned to adapt it to embrace and clamp a pipe, rod or other member, and has an ear at the other end, which is provided with a hole adapted to register with the hole in the ear of the female member aforesaid, through which a bolt or other means can be applied to secure the two members of the clamp support in place.

Prior constructions of engaging members have been so formed as to require that they should be slid endwise into place, and this is somewhat difficult of manipulation, and makes it impossible to use such parts in any restricted localities adjacent to switchboards, walls or other members of the construction. The tapered or rounded extremity of the hooked end of my clamp support and the tapered rounded end portion of the lug of the other member which fits within the same are so designed and proportioned that the male member can be put into and out of place by a partial rotation approximating an angle of about 90 degrees, more or less. This is possible by reason of the construction of the tapered extremity of the hook on the female member and the tapered and rounded lug of the clamp member as shown and described. Where the clearance laterally of the pipe is insufficient while the longitudinal clearance or space is ample, my clamp support can also be assembled in position on the pipe by sliding the male and female members endwise into connection with each other.

My clamp support is also so constructed that the ear ends may be spaced apart sufficiently to draw same firmly towards each other on the pipe, while the end of another member may be introduced in the space between the same to serve as a brace or other element.

Having thus given a general description of my invention, I will now, in order to make the matter more clear, refer to the annexed sheet of drawings which forms part of this specification and in which like characters refer to like parts.

Figure 1 is a side elevation of the lower portion of a pipe column having clamp supports illustrating certain applications of my invention; Figure 2 is a plan view drawn on a larger scale of one of the clamp supports for a four-way joint, the pipes being of uniform sizes; Figure 3 is a plan view of one of my clamp supports for a four-way joint where reducer clamps are used for two different sizes of pipes; Figure 4 is a plan view of one of my clamp supports for a three-way joint where a reducer clamp is used for two different sized pipes; Figure 5 is an end elevation of a single clamp support; Figure 6 is a plan view of a clamp support base adapted to be mounted on a floor, wall or other surface; Figure 7 is a vertical transverse sectional elevation through the clamp support column base taken on the line VII—VII of Figure 6; Figure 8 illustrates another form of pipe column clamp support base; Figure 9 is a vertical transverse sectional elevation through the clamp support column base shown in Figure 8 taken on the line IX—IX of Figure 8; and Figure 10 is a side elevation of the four-way joint shown in Figure 2.

Although for the sake of convenience of description and illustration, I have shown my clamp supports in connection with standard pipes, etc., I wish it understood that they are equally applicable to round, square or flat members or members of any other shapes, but for the sake of simplicity I will refer hereinafter only to pipes in connection with my clamp support.

Referring now to the characters of reference on the drawings:—1 is a pipe column, the lower end of which is mounted in a clamp support, which rests on the floor 3 or other surface, forming a base for said column, and this base may be of the form illustrated in Figure 1 or 8, and it may also be provided with a lag screw, as illustrated in Figures 6 and 7 to secure it in place, a small hole being provided in the flange of the base portion thereof for this purpose, as illustrated, or the screws may pass through the holes 23 as illustrated in Figures 8 and 9. The pipe 1 may be integral and extends upwardly through the clamp support, its upper end 4 being broken away as illustrated, and 2 is a transverse or horizontal pipe secured in position by means of my clamp support. The clamp support is provided with an outer ear 6 of the male portion and a body portion 7 adapted for partially surrounding the pipe, and is provided with the lug 8, the end of which is adapted to fit within the hook 9 of the female portion, the outer portion of said lug 8 being rounded and tapered, as illustrated. 9 is the hook portion of the female part of my clamp support, the extremity of which is tapered and rounded, 10 is the body portion of the same adapted to partially surround a pipe, 11 is the perforated ear adapted to receive the clamping bolt 5 which passes through registering holes in the ears 6 and 11, as illustrated. 12 is the combination portion of a clamp support for forming a four-way joint for pipes of uniform sizes, this combination portion being integral with the male member of the central clamp support, the two portions 7 and 10 of the central clamp support being arranged substantially at right angles to the other clamp supports of Figure 2 formed integral therewith. 13 is another style of combination portion of my clamp support for a four-way joint adapted for pipes of uniform sizes in which the two female portions 10 are made integral with each other and arranged at substantially right angles, and 14 is the combination portion of a clamp support similar to that illustrated at the left side of Figure 2, but having the side clamp portions of reduced size in order to accommodate pipe of smaller diameter, 15 is a combination portion of the clamp support similar to 13, having the female portion of the side clamp integral with the central portion but of reduced size to accommodate a smaller pipe, 16 is a clamp support column base as illustrated in Figures 6 and 7, 17 is the base portion thereof, 18 is an opening through the base portion adapted to receive the lag screw 19, whereby it may be secured to the floor, wall or other surface, 20 is a column clamp support base illustrated in Figures 8 and 9, 21 is the central opening in the portion 20, 22 are the outwardly extending flanges thereof, 23 are the holes or opening in said flanges to receive fastening bolts or screws, and 24 are pipe members of smaller sizes as illustrated in Figures 3 and 4.

It will be noted that by reason of my construction I can secure pipes together in almost any form desired and my clamp support can be readily installed in a space no larger than itself and secured firmly in position by means of the clamp bolts. Each of my clamp supports has a female member and I prefer to make the male members all of the same general construction, so that they are interchangeable.

The tapered and rounded end of the hooked portion of my female member and the tapered and rounded end of the lug of the male member which fits within said hook are so constructed and proportioned that my clamp supports can be assembled and disassembled by mere rotation of the clamping member, as clearly illustrated by the positions in dotted and full lines in Figure 5. This method of assembling the clamp by rotation of either the male or female clamping member adapts the construction to be used in any location where the clearance longitudinally of the pipe is small and where the lateral clearance is sufficient to permit said rotation, whereas where the lateral clearance is small and the clearance longitudinally of the pipe is sufficient my clamp supports may be placed together by sliding either the male or female member endwise. In other words my clamp supports are capable of assembling in various manners whichever is best adapted to the location, and by reason of their form and arrangement materially simplify these constructions and largely reduce the number of pieces, bolts and other parts necessary for a construction of this character. Their construction and arrangement is such that the combinations which may be made of the various parts are almost endless and any reasonable arrangement that may be desired can readily be formed, and when assembled the parts are in proper alignment and present a neat appearance, whereas with the U-bolt or other type of construction the parts would have to be side by side, causing multiplication of parts and an unsightly and unsymmertical appearance, all of which are obviated by my construction. Although the combination clamp supports, particularly as illustrated in Figures 2, 3 and 4 show the connecting pipes and braces at substantially right angles, I wish it understood that these may be arranged at any angle or in any plane to accommodate the construction desired.

Although I have described and illustrated my invention in considerable detail, I do not wish to be limited to the exact and specific details thereof as shown and described, but may use such modifications in, substitutions for, or equivalents thereof, as are embraced within the scope of my invention, or as pointed out in the claims.

Having thus described my invention, what I claim and desire to secure by Letters Patent is:—

1. A clamp support comprising a female portion adapted to partially surround a structural member provided with an integral hook at one end, a perforated ear at the other end, a male portion co-operating therewith provided with an integral outwardly extending lug adapted to be seated within the hook and an ear at the other end having a perforation adapted to register with that in the ear of the female portion, the hook and lug ends being tapered and rounding whereby said members can be located in position by rotation or by sliding endwise at least one of said members being provided with an integral extension carrying one of a similar pair of clamping members arranged at an angle thereto.

2. A clamp support comprising a female portion adapted to partially surround a structural member provided with an integral hook at one end, a perforated ear at the other end, a male portion co-operating therewith and provided with an outwardly extending lug adapted to be seated within the hook and an ear at the other end having a perforation adapted to register with that in the ear of the female member, said ear ends being spaced apart and provided with means for securing them together, the hook and lug ends being rounded and tapering, whereby said members can be located in position by rotation or sliding, at least one of said male and female members carrying a pair of similar members one of which is formed integral therewith, arranged at an angle thereto and adapted to embrace another structural member thereby forming a readily jointed frame.

3. A clamp support comprising a female member, the intermediate portion of which is adapted to contact with a structural member, and one end of which is provided with a hook, the other end having a perforated ear, a male member adapted to co-operate with the female member aforesaid, one end of which has a lug or projecting portion adapted to be seated within the hook aforesaid and a perforated ear at the other end, the perforation of which is adapted to register with the perforation in the lug of the female member, said hook end and lug end seated therein being rounded and tapered and adapted to be fitted together by rotation or sliding, means for clamping same in position by their ear ends, at least one of said male and female portions carrying one of a pair of similar members, formed integral therewith arranged at an angle thereto and adapted to embrace another structural member thereby forming a readily jointed frame.

4. A support comprising a pair of clamp members, one having a hook at one end and the other having a projection adapted to be seated within said hook, means at the opposite ends of said members for drawing and clamping the same together, said hook and end projection being rounded and tapered, at least one of said clamp members having similar members one of which is formed integral therewith arranged at an angle thereto and adapted to embrace another structural member.

5. A support comprising a pair of clamping members, one having a hook at one end and the other having a projection adapted to fit within said hook, the other ends of said members being spaced apart and provided with means for drawing them together, at least one of said pair of clamping members having similar members one of which is formed integral therewith and arranged at an angle thereto.

6. A clamp support comprising a pair of clamping members, one of which has a hook at one end, and the other a projection adapted to be seated within said hook, means at the other ends of said members for clamping the same together, at least one of said members being provided with an integral extension carrying a similar pair of clamping members arranged at an angle thereto.

7. A clamp support comprising a pair of clamping members, one of which has a hook at end end, and the other a projection adapted to be seated within said hook, the other ends of said members being spaced apart and provided with means for clamping same together, at least one of said members being provided with an integral extension carrying a similar pair of clamping members and arranged at an angle thereto.

8. A clamp support comprising a pair of clamping members, one of which has a hook at one end, and the other a projection adapted to be seated within said hook, said hook and projection being so formed that they may be secured together or taken apart by rotation, means at the other ends of said members for clamping same together, at least one of said members being provided with an integral extension arranged at an angle thereto and carrying a similar pair of clamping members.

9. A clamp support comprising a female portion having a hook end, a male portion having a projection adapted to fit within said hook, means at the opposite ends of said portions for drawing them together and clamping a structural member therebetween, one of said members being provided with an integral end flange arranged substantially at right angles to the direction of the other portions and provided with an axial opening therethrough adapted to receive a pin or bolt to secure same to a floor, wall or other surface.

10. A clamp support comprising a pair of clamping members, one of which is provided with a hook at one end, the other having a projection adapted to fit within said hook, said projection and hook both having rounded and tapered extremities, ears at the opposite ends of said members spaced apart and provided with means for drawing them together, and adapted to receive another member, the end of which is mounted in the space between said ears and secured therebetween, at least one of the pair of clamping members having an integral extension carrying a pair of similar clamping members arranged at an angle thereto and adapted to embrace another structural member.

In witness whereof I hereunto affix my signature.

HOWARD A. SELAH.